(12) United States Patent
Huang et al.

(10) Patent No.: US 6,996,037 B2
(45) Date of Patent: Feb. 7, 2006

(54) PICKUP HEAD ACTUATOR

(75) Inventors: Tai-Ting Huang, Hsinchu (TW);
Chi-Lone Chang, Hsinchu (TW);
Chau-Yuan Ke, Pingtung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 783 days.

(21) Appl. No.: 10/152,033

(22) Filed: May 22, 2002

(65) Prior Publication Data

US 2003/0218946 A1   Nov. 27, 2003

(51) Int. Cl.
*G11B 7/095* (2006.01)

(52) U.S. Cl. ............... 369/44.22; 369/44.14; 369/44.21; 720/681; 359/814

(58) Field of Classification Search ............ 369/44.21, 369/44.22, 44.19; 720/681, 690, 683
See application file for complete search history.

(56) References Cited

U.S. PATENT DOCUMENTS 4,863,240 A * 9/1989 Nakajima et al. .......... 359/814
5,864,524 A    1/1999 Sakaguchi
5,898,651 A * 4/1999 Furusawa ................ 369/44.14
6,195,314 B1 * 2/2001 Inui et al. ................ 369/44.14
6,515,947 B1 * 2/2003 Takishima ............... 369/44.14
6,665,259 B1 * 12/2003 Nakao ......................... 720/681
6,778,472 B2 * 8/2004 Nishikawa ............... 369/44.21

FOREIGN PATENT DOCUMENTS

| EP | 910071 A1 | * | 4/1999 |
| JP | 09161294 A | * | 6/1997 |
| JP | 09288835 A | * | 11/1997 |
| JP | 10228654 A | * | 8/1998 |
| JP | 10269595 A | * | 10/1998 |
| JP | 2000030272 A | * | 1/2000 |

* cited by examiner

*Primary Examiner*—W. R. Young
*Assistant Examiner*—Jorge L. Ortiz-Criado
(74) *Attorney, Agent, or Firm*—Birch, Stewart, Kolasch & Birch, LLP

(57) ABSTRACT

A pickup head actuator for carrying a plurality of near-field optical I/O elements, far-field optical I/O elements, or magnetic I/O elements. Besides performing focusing and tracking servo, the attraction due to magnetic inductor and tracking magnet enables a base to float at different heights in its normal state, suitable for different types of I/O elements.

10 Claims, 8 Drawing Sheets

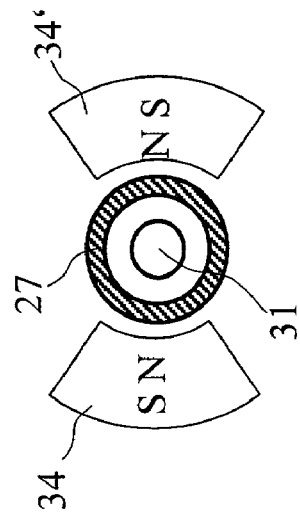
Fig. 7A
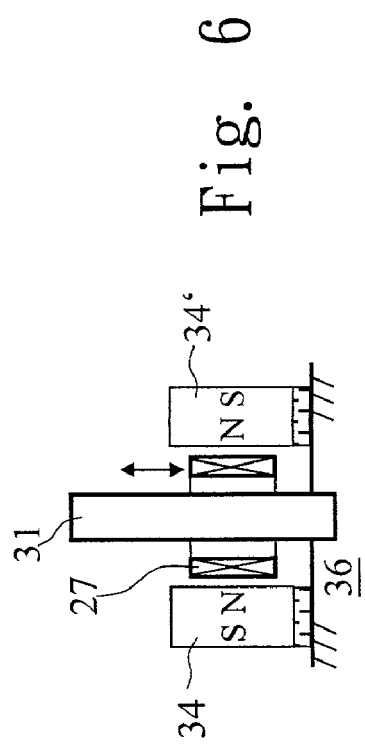
Fig. 6
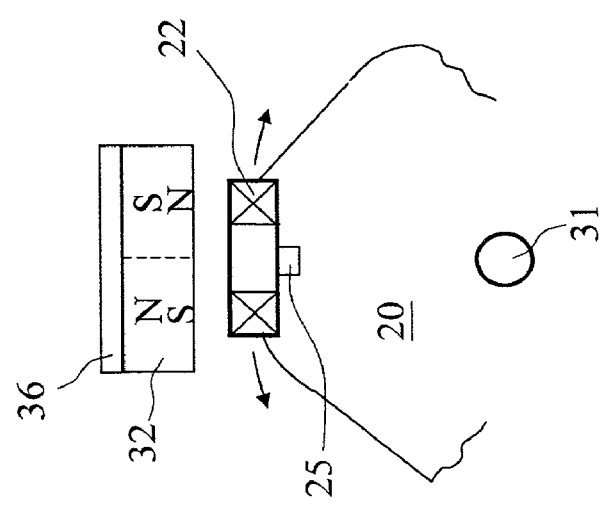
Fig. 7B
Fig. 8

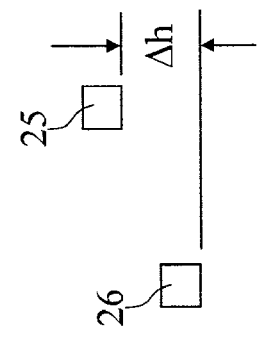
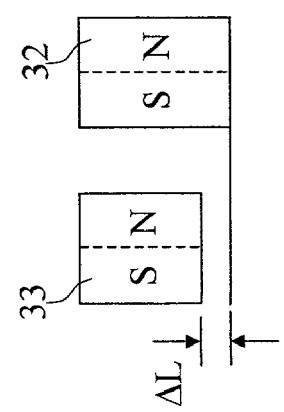
Fig. 9A
Fig. 9B
Fig. 9C
Fig. 10

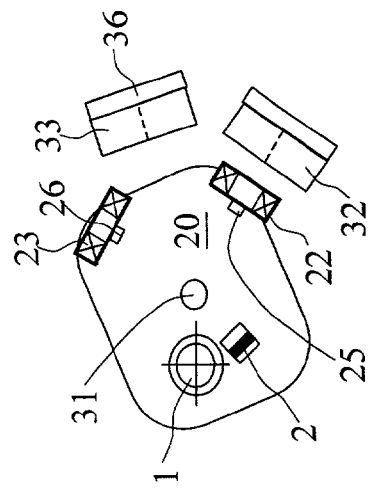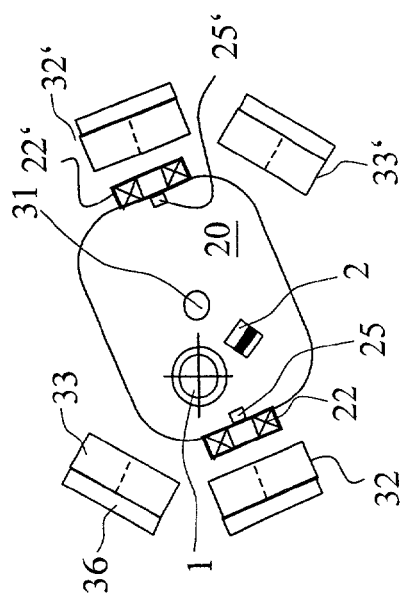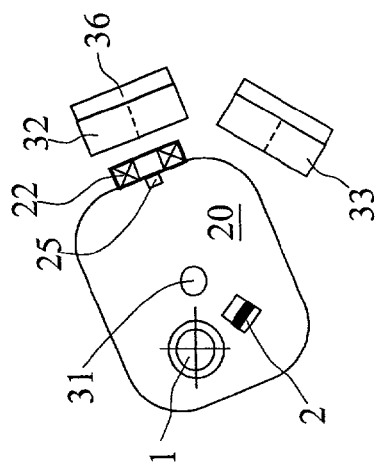

PICKUP HEAD ACTUATOR

BACKGROUND OF THE INVENTION

1. Field of Invention

The invention is a pickup head actuator for carrying a plurality of near- or far-field optical or magnetic I/O elements. In particular, the invention pertains to a pickup head actuator that is able to provide different working heights.

2. Related Art

Magnetic recording and optical recording have been widely used for data storage. Common magnetic recording media include floppy disks and hard drives, all of which have magnetic heads flying at a distance less than 1 $\mu$m from the disks. Well-known optical recording media include CD's (Compact Disc), DVD's (Digital Versatile Disc), and MO's (Magneto-optical Disc). The storage methods of these optical recording media utilize an objective lens with a specific NA (Numerical Aperture) to focus a laser beam on the discs. The distance from the objective lens to the disc (the so-called working height) is usually far larger than the wavelength of the laser beam. Therefore, they are called far-field optical recording media.

With the advance in modern technologies, to achieve storage of higher-density data a lot of near field optical data recording have appeared. Such devices as the SIL (Solid Immersion Lens), the SIM (Solid Immersion Mirror), and the VCSEL (Vertical Cavity Surface Emitting Laser) use a flying head to perform data recording at a height within 100 nm.

Although near field optical recording can greatly increase the data storage density, it is nevertheless incompatible with far field optical recorders. This results in extra costs for consumers. Moreover, even far field recording elements differ in their focal lengths. Therefore, it is of urgent needs to provide a pickup head compatible with all sorts of far field optical recording media, the near field optical recording media, and even magnetic recording media.

To solve the compatibility problem, there were many methods proposed in the prior art. For example, the U.S. Pat. No. 5,864,524 provided a structure of a base installed with two objective lenses. The base can be rotated under the interaction of a side magnet and a coil on the base, selecting one of the objective lenses to work. With reference to FIG. 1, the base 12 has a first objective lens 121 and a second objective lens 122. The work heights of the objective lenses 121, 122 are different and the base 12 only rotates horizontally relative to the disc 11 to select an appropriate work objective lens. When the second objective lens 122 with a lower work height is used, data access can be properly performed. When the first objective lens 121 is used, the disc 11 has severe vibrations because the storage media with a larger work height has a lower precision. This does not have much influence on the first objective lens 121, but may cause damages to the closer second objective lens 122. The result of such severe vibrations can possibly erode the second objective lens or have scrapes and cuts on the disc 11. This obviously is a big disadvantage of composite-lens pickup heads. Thus, the applications are only good for far field recording media with different focal lengths, e.g. CD-DVD systems.

SUMMARY OF THE INVENTION

To solve the above-mentioned problems in the prior art and to satisfy the compatibility requirement, the invention provides a single pickup head compatible among near field and far field optical recording media as well as magnetic recording media.

The disclosed pickup head actuator contains a base, a support axis, a focusing unit, and tracking unit. The base provides the installation for at least two data I/O elements and is installed on the support axis. It can move along the support axis vertically to the recording medium and rotate about the central axis of the support axis. The focusing unit contains focusing magnets and a focusing coil. The focusing coil is installed on the base around the support axis, with the focusing magnets on the side. When the focusing coil is supplied with an electric current, it interacts with the focusing magnets so that the base moves along the support axis.

The tracking unit includes at least one tracking coil and two tracking magnets. The tracking coil is installed at the border of the base with the tracking magnets on the side. When the tracking coil is supplied with an electric current, it rotates to match with one of the tracking magnets so that one of the data I/O elements is put into work. Through the interactions between the tracking coil and the tracking magnet, a small angle rotation is made possible for the tracking servo of the data I/O elements.

To further save driving energy and the convenience in use, the data I/O elements are installed at different heights. The base has at least one magnetic inductor, which is attracted by the tracking magnet, to maintain the base normally in a floating state, reducing the needed driving energy. With different installation heights or sizes of the tracking magnets, the base can be maintained at different floating heights. On the other hand, the same effect can be achieved by installing two magnetic inductors at different heights. Therefore, the data I/O elements can function at different work heights, achieving the desired compatibility with a single pickup head.

BRIEF DESCRIPTION OF THE DRAWINGS

The invention will become more fully understood from the detailed description given hereinbelow illustration only, and thus are not limitative of the present invention, and wherein:

FIG. 6 shows the focusing action of the invention;

FIGS. 7A and 7B are schematic views of the focusing magnets in the invention;

FIG. 8 shows the action of the disclosed tracking magnet;

FIGS. 9A through 9C are schematic view in the first embodiment of the controlled balance position;

FIG. 10 is a schematic view in the second embodiment of the controlled balance position;

FIG. 11A shows a second embodiment of the invention;

FIG. 11B shows a third embodiment of the invention;

FIG. 11C shows a fourth embodiment of the invention;

DETAILED DESCRIPTION OF THE INVENTION

Figure 1:
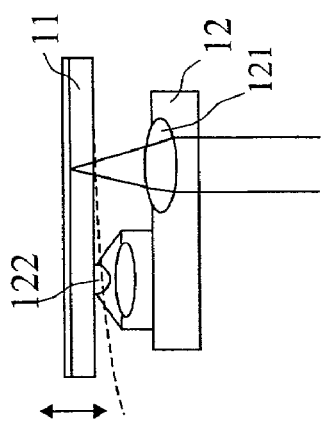
FIG. 1 is a schematic view of a conventional pickup head.
Figure 2B:
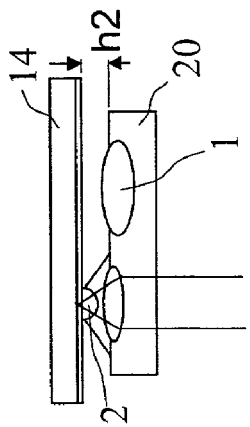
FIGS. 2A and 2B are schematic views of the invention.
Figure 2A:
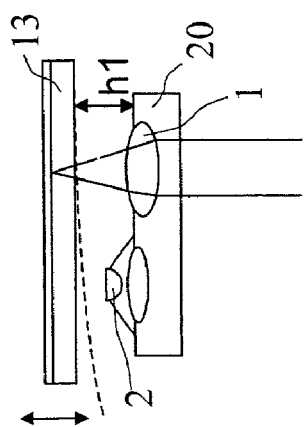

In accordance with the disclosed pickup head actuator, the invention is capable of changing the work height for different data I/O elements. With reference to FIGS. 2A and 2B, the base 20 has a far field pickup head 1 and a near field pickup head 2. When the far field pickup head 1 is used, the height of the base 20 above a far field disc 13 is h1; while when the near field pickup head 2 is used, the height of the base 20 above a near field disc 14 is h2, where h2<h1. When the far field pickup head 1 is used, even if the far field disc 13 has large vibrations the near field pickup head 2 will not be affected or damaged.

Figure 3:
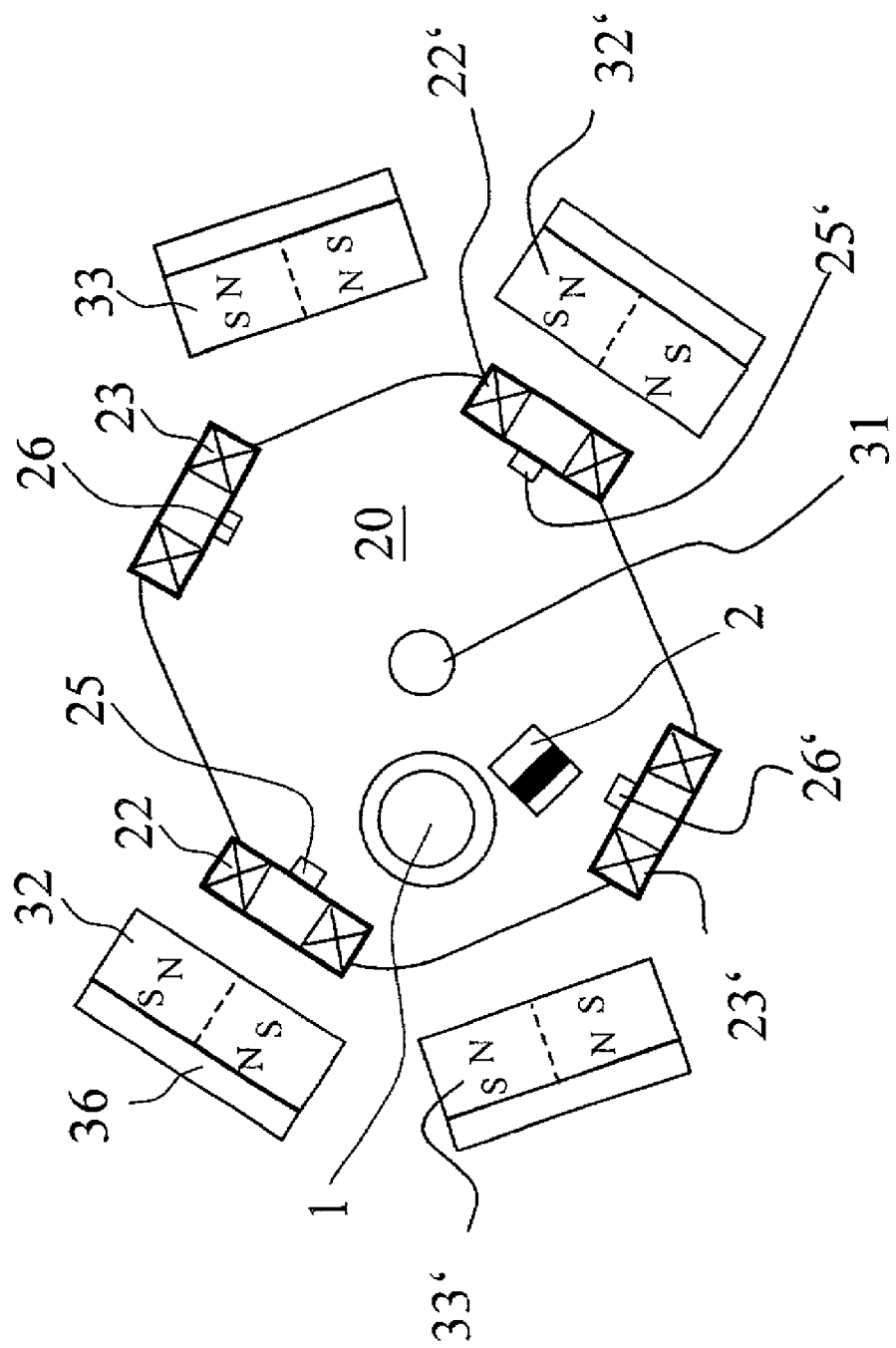
FIG. 3 shows the first position of the invention.

As shown in FIG. 3, the pickup head actuator contains a base 20, a support axis 31, a focusing unit and a tracking unit. The base 20 has locations for installing two data I/O elements. Of course, to increase its compatibility it is preferable to install one far field pickup head 1 and one near field pickup head 2. Such pickup heads may be arbitrary combinations of objective lenses with predetermined NA's, SIL's, magnetic heads, holographic lasers, SIM's, and VCSEL's. The base 20 is installed on the support axis 31 to have rotations relative to the support axis 31 or motions along the long axis direction of the support axis 31.

Figure 5:
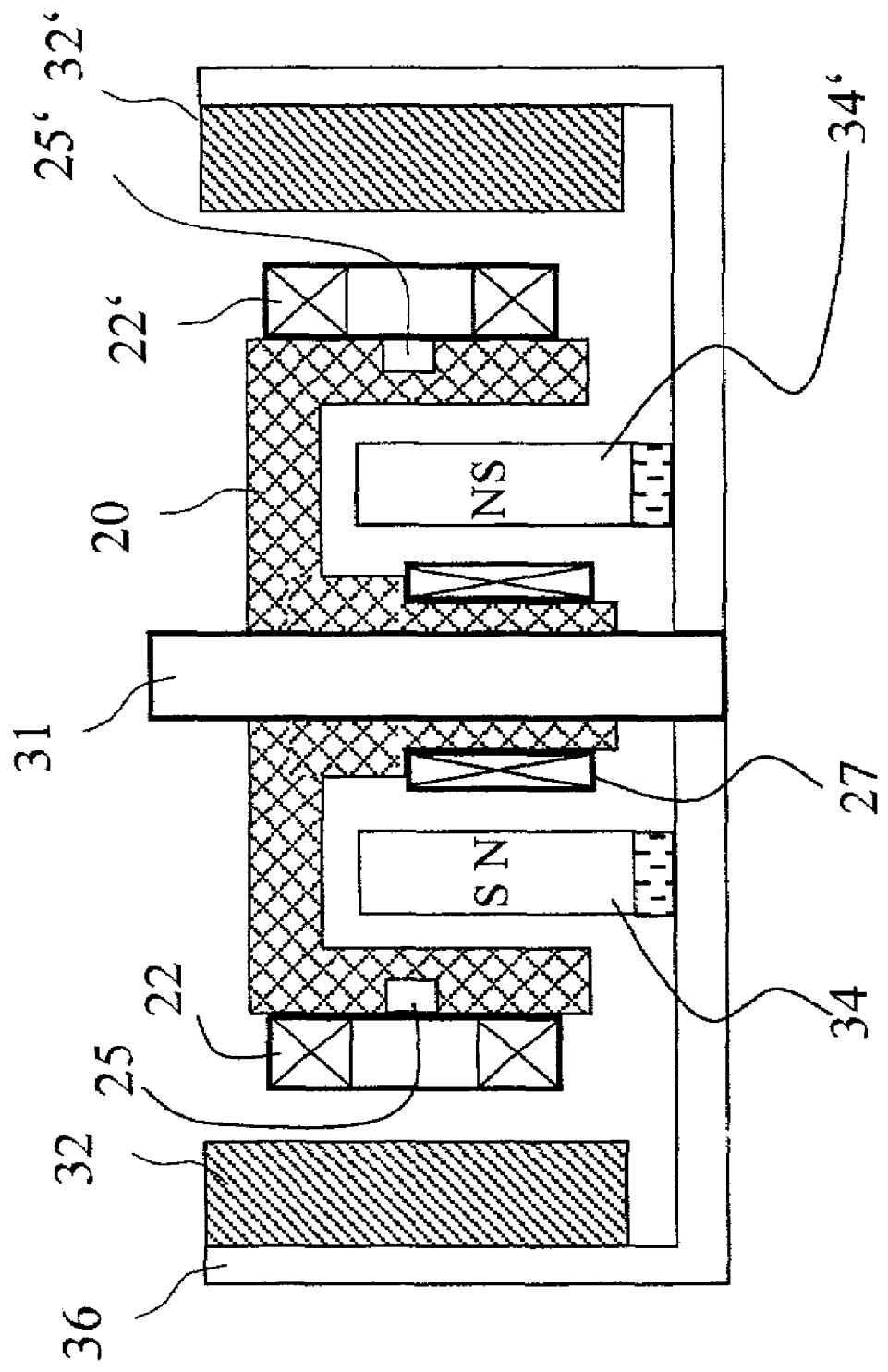
FIG. 5 is a side view of the invention.

The focusing unit contains a focusing coil 27 and focusing magnets 34, 34'. With reference to FIG. 5, the focusing coil 27 is installed on the base 20 around the support axis 31. The focusing magnets 34, 34' are installed on the outer side of the focusing coil 27. The focusing magnets 34, 34' have the same pole pointing to the focusing coil 27. When the focusing coil 27 is provided with an electric current, it produces an electromagnetic force interacting with the focusing magnets 34, 34' (attraction or repulsion), so as to have a small displacement along the long axis direction of the support axis 31 (FIG. 6), producing a focusing effect. The focusing magnets 34, 34' may have an arc or cylindrical shape installed symmetrically on both sides of the support axis 31, as shown in FIGS. 7A and 7B.

Figure 4:
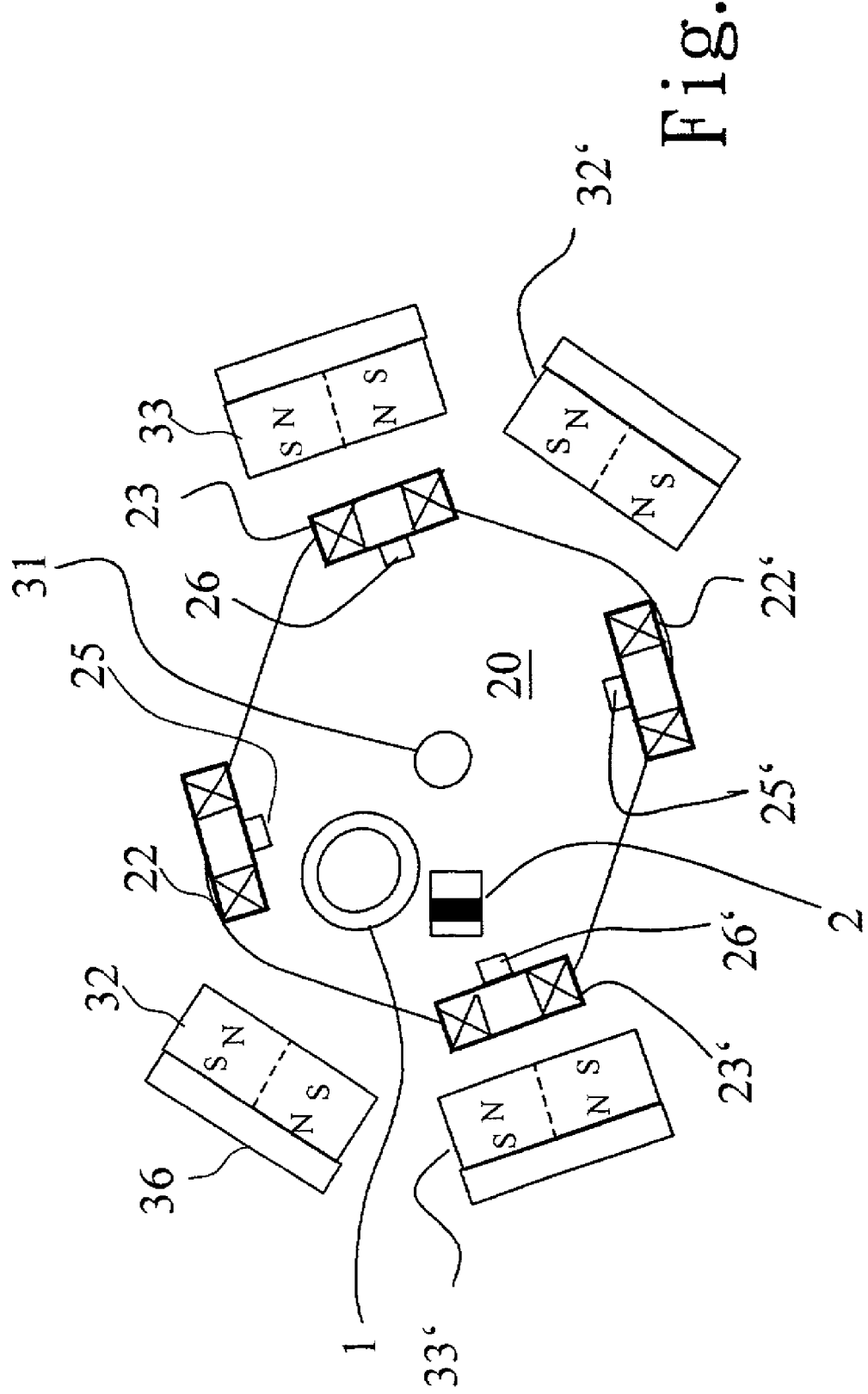
FIG. 4 shows the second position of the invention.

The tracking unit basically has two functions: one being tracking servo and the other being rotating the base to switch among different data I/O elements. The tracking unit contains tracking coils 22, 22', 23, 23' and tracking magnets 32, 32', 33, 33'. The tracking coils 22, 22', 23, 23' are installed around the base 20. The tracking coils 22, 22' and the tracking coils 23, 23' are disposed in pairs at symmetric positions with respect to the support axis 31. The tracking magnets 32, 32', 33, 33' are installed on the outer sides of the tracking coils 22, 22', 23, 23'. The tracking magnets 32, 32' and the tracking magnets 33, 33' are also disposed in pairs at symmetric positions with respect to the support axis 31. Only one pair of tracking coils 22, 22' or 23, 23' is in alignment with a pair of tracking magnets 32, 32' or 33, 33' at a time. That is, if the tracking coils 22, 22' are in alignment with the tracking magnets 32, 32', the tracking coils 23, 23' are not in alignment with the tracking magnets 33, 33', and vice versa. Please refer to FIGS. 3 and 4, where the system switches between a first position and a second position.

As shown in FIG. 8, when the tracking coil 22 is supplied with a current to generate a magnetic field, it interacts with the corresponding tracking magnet 32 and makes a small-angle wiggle with respect to the support axis 31. The near-field pickup head 2 or the far-field pickup head 1 on the base 20 is thus capable of performing tracking servo. Furthermore, a large current can be supplied to the tracking coils 22, 22', 23, 23' to produce a larger electromagnetic force and therefore overcome the binding force from the corresponding tracking magnets 32, 32', 33, 33', switching to another set of coil-magnet alignment. The system thus switches between the first position and the second position for make the near-field pickup head 2 or the far-field pickup head into action. No matter which pickup head is functioning, the system can always use the tracking unit for tracking servo, the focusing unit for focusing, or use the tracking unit to switch to another pickup head.

On the other hand, when the focusing coil 27 is supplied with a current, the base 20 can float relative to a magnet base 36 or a disc due to the interactions with the focusing magnets 34, 34'. Therefore, the balance position of this floating state can provide different work heights. Due to this design, however, each driving requires a fairly large electric current through the focusing coil 27 to overcome the weights of the base 20 and the pickup heads 1, 2 for floating before they can start functioning. Therefore, it wastes a lot of energy. To solve this problem, a magnetic inductor 25, 25', 26, 26' is provided on the inner side of each tracking coil 22, 22', 23, 23'. These magnetic inductors may be iron alloys that can be attracted by the magnetic force. Under the normal state, even if the focusing coil 27 or the tracking coils 22, 22', 23, 23' are not supplied with any current, the magnetic inductors 25, 25', 26, 26' can still be attracted by the tracking magnets 32, 32', 33, 33', keeping the base 20 in its floating state. By installing different sets of tracking magnets 32, 32' and 33, 33' at different heights, with a height difference Δh, (FIG. 9A) or making them have different sizes, with a size difference ΔL, (FIGS. 9B, 9C), the magnetic inductors 25, 25', 26, 26' are attracted and float at different positions. Taking FIG. 9A as an example, when the pickup head actuator is in the first position, i.e. when the tracking coils 22, 22' are in alignment with the tracking magnets 32, 32', the base 20 is floating roughly at the center of the tracking magnets 32, 32'. When the pickup head actuator is at the second position, i.e. the tracking coils 23, 23' are in alignment with the tracking magnets 33, 33', the base 20 is floating roughly at the center of the tracking magnets 33, 33'. Since the tracking magnets 32, 32' and the tracking magnets 33, 33' are installed with a height difference Δh, the balanced base 20 at the first position and the second position relative to the magnet base 36 also differ roughly by the distance Δh. Therefore, the far-field pickup head 1 and the near-field pickup head 2 on the base 20 have different work heights (see FIGS. 2A and 2B). On the other hand, with a height difference Δh between the magnetic inductors 25, 26, different work heights can be achieved for tracking magnets 32, 32', 33, 33' with the same height and size (see FIG. 10).

It should be noted that the numbers of the tracking coils and tracking magnets do not need to match with each other. For example, in the second embodiment of the invention, a set of tracking coils 22, 22' is accompanied with two sets of tracking magnets 32, 32', 33, 33' (see FIG. 11A). In the third embodiment of the invention, two sets of tracking coils are accompanied with two tracking magnets 32, 33 (see FIG. 11B). The fourth embodiment of the invention uses one tracking coil 22 and two tracking magnets 32, 33 (see FIG. 11C). All the above examples can achieve the same effects.

Figure 12A:
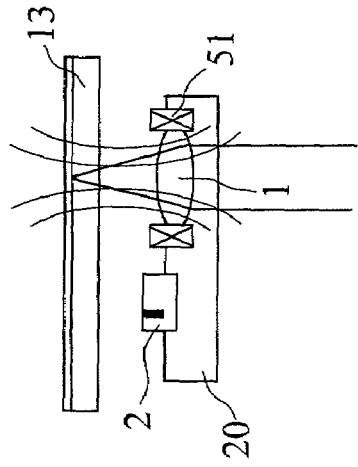
FIGS. 12A and 12B are schematic views of the invention in combination with magnetic field generators.
Figure 12B:
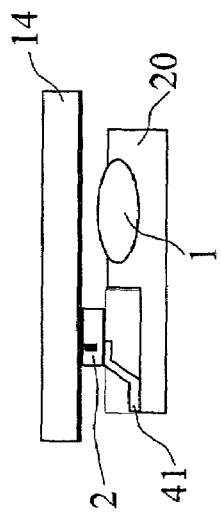
Figure 13:
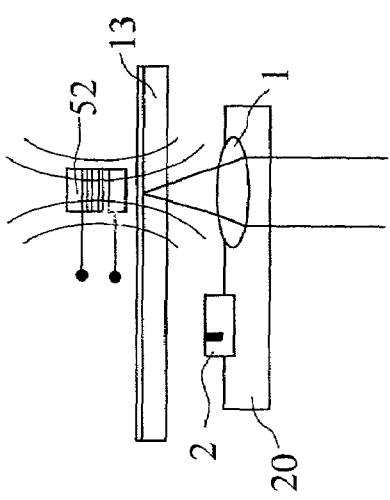
FIG. 13 is a schematic view of the invention in combination with an elastic object.

In accordance with magneto-optical media data, a magnetic field generator can be provided close to the far-field pickup head 1 or the near-field pickup head 2. Such a magnetic field generator may be a magnetized coil 51 (FIG. 12B) or an external magnetic source 52 (FIG. 12A), so that the far-field pickup head 1 or the near-field pickup head 2 can access data stored on magnetic and optical media. Moreover, the near-field pickup head 2 can use an elastic object 41 installed on the base 20 to achieve a high stability of the system. That is, even if the near-field disc 14 gets close to the near-field pickup head 2 due to vibrations, the elastic object 41 wiggles in response to the near-field disc 14, having motion relative to the base 20 without affecting the base 20.

EFFECTS OF THE INVENTION

The invention discloses a pickup head actuator, which uses tracking magnets and tracking coils along with magnetic inductors to switch among different data I/O elements. The invention provides different work heights at different positions for various kinds of data I/O elements, such as optical near-field and far-field I/O elements and magnetic I/O elements, so that different types of storage media can be accessed. Existing storage media and future near-field optical storage media are all taken into account in the design so that a single pickup head can achieve the maximal compatibility.

Certain variations would be apparent to those skilled in the art, which variations are considered within the spirit and scope of the claimed invention.

What is claimed is:

1. A pickup head actuator for a recording medium device that is capable of accessing data on a recording medium inside the recording medium device, the pickup head actuator comprising:

a base providing the installation of more than one data I/O elements;

a support axis installed with the base so that the base is able to move along the support axis in the perpendicular direction of the recording medium and to rotate about the support axis;

a focusing unit containing at least one focusing coil and a corresponding focusing magnet, the focusing coil being installed on the base around the support axis, the focusing magnet being installed on the outer side of the corresponding focusing coil, so that when the focusing coil is in action the magnetic force generated by the focusing magnet pushes the base to move along the support axis;

a tracking unit containing at least one tracking coil and two tracking magnets, the tracking coil being installed on the outer side of the base and the tracking magnets being installed next to the base, wherein the base rotates about the support axis in response to the action of the tracking coil so that the tracking coil is in alignment with one of the tracking magnets and makes a small-angle wiggle under the interaction between the tracking coil and the tracking magnets; and a magnetic inductor installed on the base and attracted by one of the tracking magnets, keeping the base floating in its normal state such that the base reaches balance at different floating distances from the recording medium for the data I/O element to function at different work heights.

2. The pickup head actuator of claim 1, wherein the tracking magnets have a height difference between their central positions so that the base balances at different heights.

3. The pickup head actuator of claim 2, wherein the two tracking magnets are disposed at different heights.

4. The pickup head actuator of claim 2, wherein the two tracking magnets have different sizes.

5. The pickup head actuator of claim 1, wherein the data I/O elements are selected from the group consisting of the combinations of optical near-field I/O elements, optical far-field I/O elements, and magnetic I/O elements.

6. The pickup head actuator of claim 1, wherein the data I/O elements are selected from the group consisting of the combinations of objective lenses with predetermined NA's (Numerical Aperture), SIL's (Solid Immersion Lens), magnetic heads, holographic lasers, SIM's (Solid Immersion Mirror), and VCSEL's (Vertical Cavity Surface Emitting Laser).

7. The pickup head actuator of claim 1, wherein there are two tracking coils with only one of them being in alignment with one of the tracking magnets at a time.

8. The pickup head actuator of claim 7, wherein each of the tracking coils has a magnetic inductor installed at a different height, so that when one of the tracking coils is in alignment with one of the tracking magnets it is attracted by the corresponding tracking magnet, keeping the base floating at a different height.

9. The pickup head actuator of claim 1, wherein the data I/O element is an optical I/O element in combination with a magnetic field generator for accessing data stored on magneto-optical recording media.

10. The pickup head actuator of claim 1, wherein the data I/O element uses an elastic object installed on the base so that the data I/O element is capable of making relative motion to the base.

* * * * *